May 6, 1941.  H. CONINE  2,240,983
SAFETY SAW GUARD
Filed Nov. 7, 1939  2 Sheets-Sheet 1
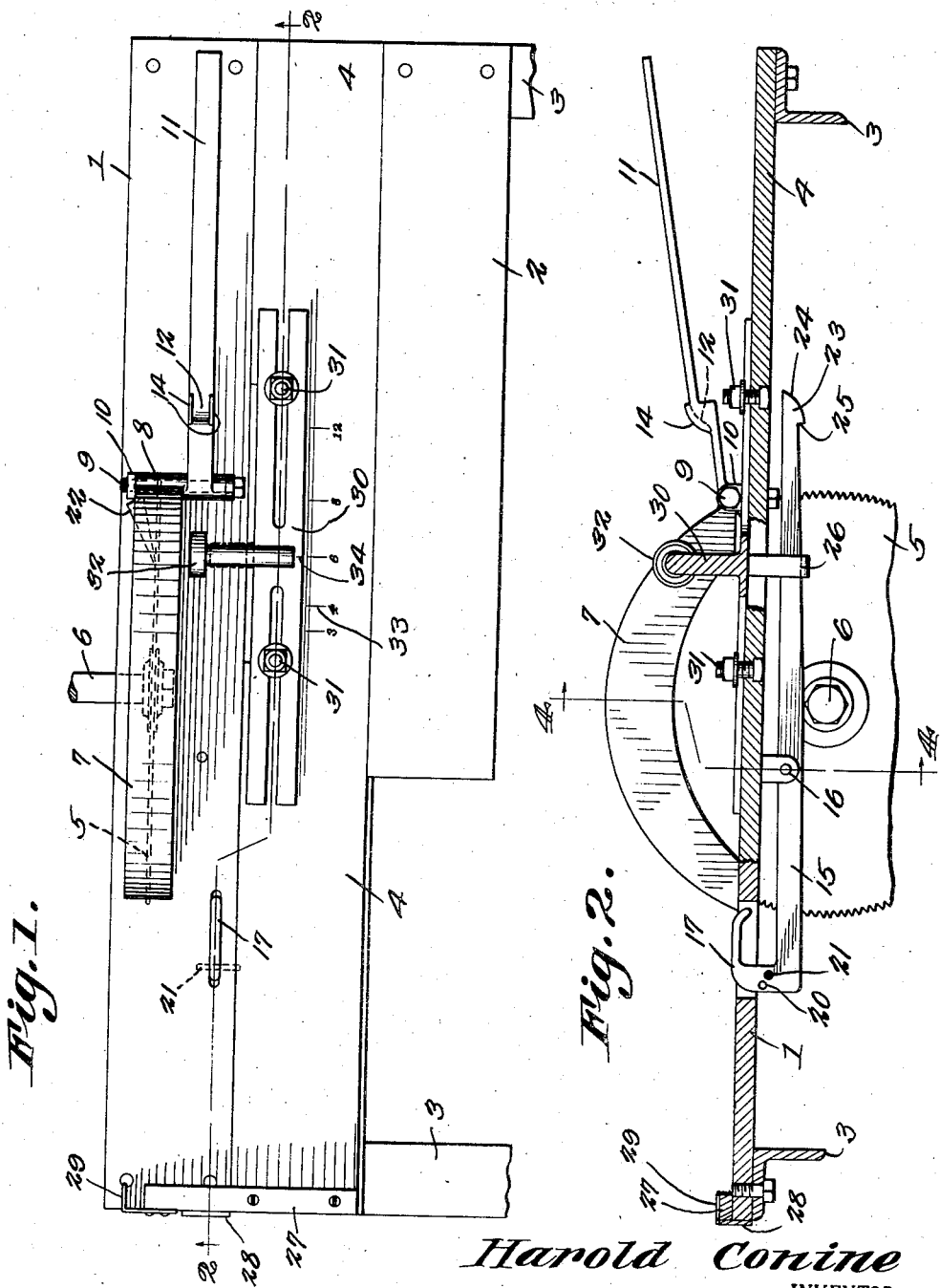
Harold Conine
INVENTOR.
BY Knowles.
ATTORNEYS.

May 6, 1941. H. CONINE 2,240,983
SAFETY SAW GUARD
Filed Nov. 7, 1939 2 Sheets-Sheet 2
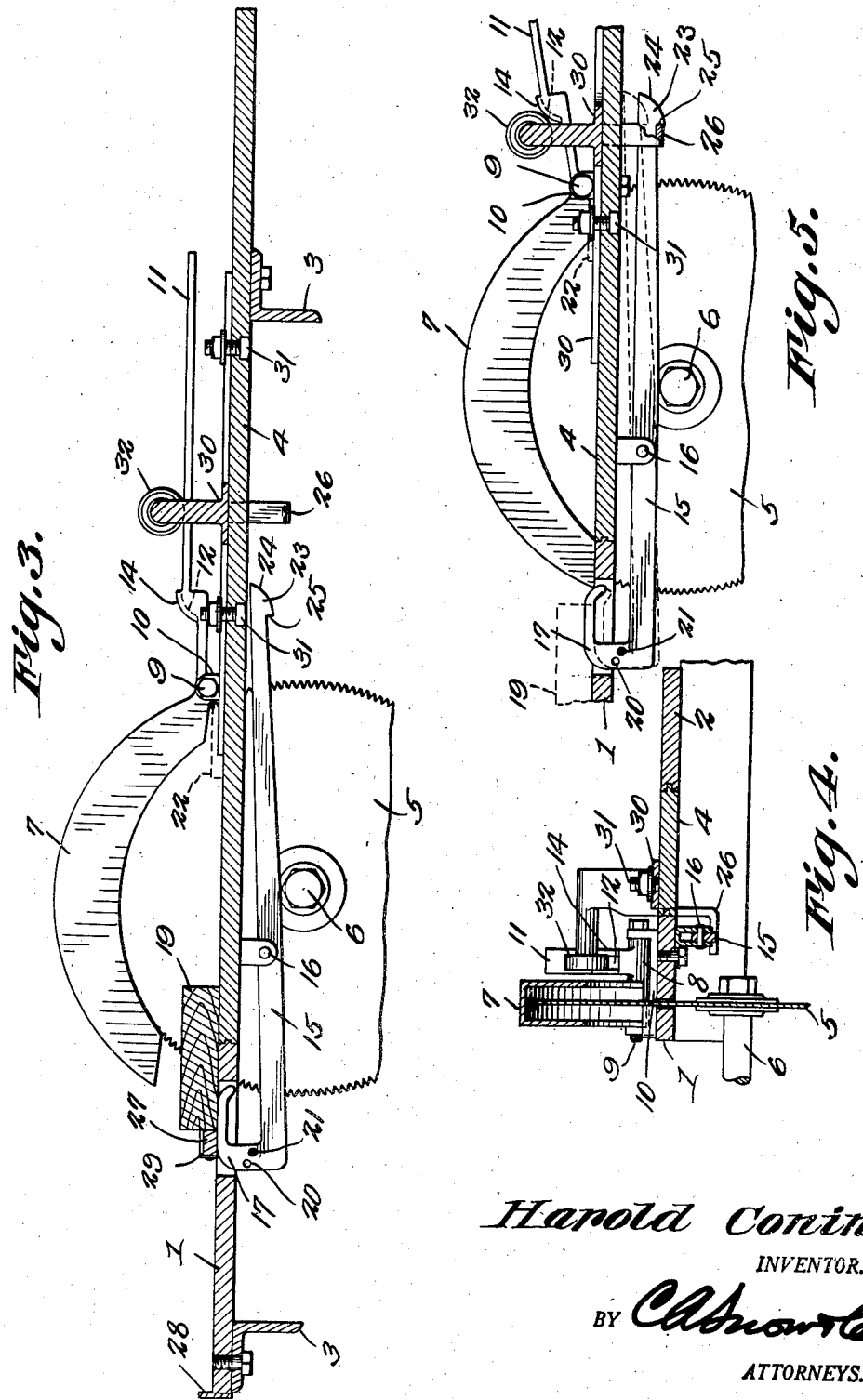
Harold Conine
INVENTOR.
BY
ATTORNEYS.

Patented May 6, 1941

2,240,983

UNITED STATES PATENT OFFICE 2,240,983

SAFETY SAW GUARD

Harold Conine, Pine Valley, Okla.

Application November 7, 1939, Serial No. 303,266

2 Claims. (Cl. 143—159)

This invention aims to provide a novel means for automatically operating and controlling a saw cover.

Fig. 1 is a top plan of a machine constructed in accordance with the invention, Fig. 2 is a section on the line 2—2 of Fig. 1, Fig. 3 is a longitudinal section showing the parts as they will appear after the guard has been raised, Fig. 4 is a cross section on the line 4—4 of Fig. 2, and Fig. 5 is a longitudinal section showing the parts as they will appear before the guard is raised and shortly before the sawing operation is begun.

The transversely spaced parts 1 and 2 of a saw table are secured to a supporting frame 3, the part 2 being somewhat shorter than the part 1, in some instances, to facilitate operations incident to the working of the machine. A feed slide 4 is located between the table parts 1 and 2, and is tongued and grooved thereinto, for straight line sliding movement.

A buzz saw 5 works through a slot in the table part 1 and is secured to a rotatable arbor 6. The working part of the saw 5 is received in a guard 7 which is arched both longitudinally and transversely. The forward end of the guard 7 is adapted to rest on the table member 1, but the back end of the guard is supplied with a tubular bearing 8, receiving a shaft 9 held in a transverse support 10 on the table member 1, the construction being such that the guard 7 can swing up and down. The bearing 8 has an arm 11, offset inwardly with respect to the guard 7, the arm extending lengthwise of the table part 1. Intermediate its ends, the arm 11 is provided with an upwardly and rearwardly inclined shoulder 12. There are upstanding guide flanges 14 on the arm 11, on opposite sides of the shoulder 12. A ramp block 22 is secured to the table part 1, adjacent to the hinged mounting of the guard 7, and has an inwardly and forwardly inclined outer surface extended into close vicinity to the saw 5.

A latch lever 15 is located under the table part 1 and is fulcrumed intermediate its ends, at 16, thereon. At its forward end, the latch lever 15 is supplied with an upwardly extending projection 17 which works through a hole in the table 1. In operation, the projection 17 of the latch lever 15 is adapted to engage a board 19 which is to be cut by the saw 5. The projection 17 has holes 20, for the adjustable reception of a cross pin 21, which, cooperating with the under side of the table part 1, prevents the projection 17 from moving upwardly too far, under some circumstances.

At its rear end, the lever 15 is provided with a latch 23. The rear edge 24 of the latch 23 is downwardly and forwardly inclined, and at the forward extremity of the edge 24, the part 23 has a transverse shoulder 25. The rear end of the latch lever 15 is adapted to cooperate with a depending and transversely extended L-shaped keeper 26 on the feed slide 4.

At its rear end, the feed slide 4 is provided with a cross arm 27, overhanging the table part 1 and adapted to engage a stop 28 on the table part 1, to limit the retraction of the feed slide 4. An angle bracket is secured to the cross arm 27 and affords a finger 29, disposed parallel to the saw 5 and spaced from the adjacent end of the cross arm.

A slotted bracket 30 is secured by bolts 31 to the feed slide 4 and carries a roller 32, disposed above the table part 1, and adapted to cooperate with the shoulder 12 of the arm 11 of the guard 7.

A scale 33 is inscribed on the feed slide 4 and extends lengthwise of the feed slide. An index 34 on the base of the bracket 30 is adapted to cooperate with the scale 33.

Before the machine is put into motion, the feed slide 4 stands in a retracted position, subject to the will of an operator, but most naturally in the position of Fig. 1, the cross arm 27 on the feed slide engaging the stop 28 on the table part 1. The operator advances the feed slide 4, and the roller 32 that is carried by the feed slide passes between the guiding flanges 14 of the lever 11 and engages the shoulder 12 of the lever. The guard 7 is raised so that a board can be pushed under its forward end, the roller 32 riding upon the arm 11 to hold the guard 7 elevated. That operation is mentioned at this point simply in order that what follows may be understood. It is not the next-occurring operation in actual procedure.

What happens, prior to the elevation of the guard 7 is that, when the feed slide 4 moves to the right from the position of Fig. 2 to the position of Fig. 5, the keeper 26 on the slide moves along the under edge of the latch lever 15 until the keeper engages the shoulder 25 of the latch portion 23 of the lever. This stops the movement of the feed slide to the right, with the parts in the position of Fig. 5. Here note that the roller 32 which is carried by the feed slide 4, is close to, but not in engagement with the inclined shoulder 12 of the arm 11. It is impossible to move the feed slide 4 further to the right and cause the roller 32, cooperating with the shoulder 12 of the arm 11, to elevate the guard 7 to the position of Fig. 3.

The board 19 (Fig. 5) is laid in place, and cooperating with the projection 17 of the latch lever 15, tilts the latch lever on its fulcrum 16 and raises the latch part 23 of the lever until the shoulder 25 is clear of the keeper 26. The feed slide 4 is advanced and the roller 32 then moves from the position of Fig. 5 to the position of Fig. 3, the guard 7 being raised to admit the board 19 to the saw 5. The board 19, under the push of the cleat or cross arm 27 on the slide 4, is advanced with respect to the saw 5, and the severing operation takes place.

It may be observed that the space between the finger 29 and the adjacent end of the cross arm 27 on the feed slide 4 is for the reception of the periphery of the saw 5. The finger 29 advances the piece of board that has been cut off, and the piece of board, cooperating with the inclined edge of the ramp block 22, slides laterally, clear of the machine.

When the feed slide 4 is moved back to the left, for instance to the position of Fig. 1, the roller 32 on the feed slide rides clear of the arm 11, and the guard 7 swings down on the table part 1 in housing relation to the otherwise exposed, working portion of the periphery of the saw 5.

The guard 7 must be raised at a stage in the operation whereof the width of the board is a function. Stated otherwise, the distance between the roller 32 and the shoulder 12 when the parts are in the position of Fig. 5, has to be varied according to the width of the board. That can be done by slacking away the bolts 31 and moving the bracket 30 and associated parts lengthwise of the machine, the index 34 on the base of the bracket cooperating with the appropriate one of the markings of the scale 33 on the slide 4. When the desired adjustment has been obtained, the bolts 31 are tightened, to hold the bracket in its adjusted position with respect to the feed slide 4.

The device is simple in construction but it affords a convenient means whereby injuries to operators, due to contact with the saw 5, will be cut down to a minimum.

The drawings show a satisfactory and operative form of the invention, but a mechanic who abides by what is claimed, can make alterations in the precise structure shown, without departing from the spirit of the invention.

In this application, the word "board" is used in the interest of simplicity and directness, but is to be construed as meaning any sort of material to be sawn asunder.

What is claimed is:

1. In a wood sawing machine, a table, a feed slide mounted for reciprocation with respect to the table, a saw associated with the table, a saw guard hingedly mounted on the table, elements carried by the guard and by the slide and engaging to swing the guard away from the saw when the slide is advanced, and a latch means comprising a part on the table and a part on the slide, said parts interengaging to stop the advance of the slide before the guard has been swung as aforesaid, the table-carried part of the latch means being accessible to material placed on the table, to release the latch parts and permit a further advance of the slide.

2. In a wood sawing machine, a table, a feed slide mounted for reciprocation with respect to the table, a saw associated with the table, a saw guard hingedly mounted on the table and provided with an arm having a shoulder intermediate its ends, a member carried by the slide and engageable with the shoulder to swing the guard away from the saw when the slide is advanced, latch means comprising a part on the table and a part on the slide, said parts interengaging to stop the advance of the slide before the guard has been swung as aforesaid, the table-carried part of the latch means being accessible to material placed on the table, to release the latch parts and permit a further advance of the slide, said member of the slide moving along the arm, beyond the shoulder, upon further advance of the slide, to hold the guard in inoperative relation to the saw.

HAROLD CONINE.